United States Patent [19]
Doyle et al.

[11] Patent Number: 5,454,938
[45] Date of Patent: Oct. 3, 1995

[54] BED HEIGHT SENSING DEVICE FOR BIOLOGICAL REACTOR

[75] Inventors: Michael Doyle, Wauwatosa; Peter J. Petit, Waukesha; Eugene Mazewski, Pewaukee, all of Wis.

[73] Assignee: Envirex Inc., Waukesha, Wis.

[21] Appl. No.: 238,393

[22] Filed: May 5, 1994

[51] Int. Cl.⁶ ........................................ C02F 3/06
[52] U.S. Cl. .................. 210/106; 210/150; 210/219; 210/280; 210/786
[58] Field of Search ................... 260/616–618, 260/786, 104, 105, 106–108, 143, 150, 151, 219, 276, 280

[56] References Cited

U.S. PATENT DOCUMENTS

| | | | |
|---|---|---|---|
| 3,846,289 | 11/1974 | Jeris et al. | 210/8 |
| 3,956,129 | 5/1976 | Jeris et al. | 210/189 |
| 4,009,098 | 2/1977 | Jeris | 210/618 X |
| 4,009,105 | 2/1977 | Jeris | 210/107 |
| 4,177,144 | 12/1979 | Hickey et al. | 210/106 |
| 4,182,675 | 1/1980 | Jeris | 210/618 |
| 4,202,774 | 5/1980 | Kos | 210/274 |
| 4,250,033 | 2/1981 | Hickey et al. | 210/106 |
| 4,419,243 | 12/1983 | Atkinson et al. | 210/618 |
| 4,454,038 | 6/1984 | Shimodaira et al. | 210/150 |
| 4,469,599 | 9/1984 | Gros et al. | 210/610 |
| 4,589,927 | 5/1986 | Allen et al. | 210/618 |
| 4,655,924 | 4/1987 | Heijnen | 210/150 |
| 4,659,463 | 4/1987 | Chandler et al. | 210/202 |
| 4,681,685 | 7/1987 | Sutton et al. | 210/618 |
| 5,019,268 | 5/1991 | Rogalla | 210/151 |
| 5,147,530 | 9/1992 | Chandler et al. | 210/90 |
| 5,158,686 | 10/1992 | Kigel | 210/713 |
| 5,372,712 | 12/1994 | Petit | 210/151 |

Primary Examiner—Thomas Wyse
Attorney, Agent, or Firm—Michael, Best & Friedrich

[57] ABSTRACT

The invention provides a reactor apparatus including a fluid bed reactor containing a media bed composed of particulate solids and biomass adhered thereto. The reactor apparatus also includes a biomass monitoring system for measuring changes in the size of the media bed and for activating a biomass growth control system when conditions with the reactor call for removal of excess biomass. The biomass monitoring system includes a vertical tubular member that is supported in the reactor and that serves to isolate a parameter or condition indicative of the size of the media bed. The biomass monitoring system also includes a sensing device for measuring changes in the isolated parameter or condition, and a mechanism for activating the biomass growth control system when signaled by the sensing device.

17 Claims, 2 Drawing Sheets

BED HEIGHT SENSING DEVICE FOR BIOLOGICAL REACTOR

BACKGROUND OF THE INVENTION

1. Field of the Invention

The invention relates generally to liquid treatment reactors including media beds that are expandable as a result of the growth or accumulation of biological or other material within those beds, and more particularly to methods and apparatus for monitoring or measuring bed size during reactor operation.

2. Reference to Prior Art

Principles of operation of fluid bed biological reactors are provided in U.S. Pat. Nos. 4,182,675, 4,009,105, 4,009,099, 4,009,098, 3,956,129 and 3,846,289. Briefly, a biological fluid bed reactor includes a reactor tank containing a media bed made up of particulate solids, such as sand or activated carbon, with microorganisms (or biomass) adhered thereto to form "bioparticles". A reactor influent, such as wastewater, is conducted upwardly through the reactor tank at a velocity sufficient to fluidize the media bed, and the biomass interacts with that upflow to produce a treated effluent. The interaction between the biomass and the reactor influent also produces biological growth which over time results in media bed expansion that must be controlled to prevent loss of bioparticles with the reactor effluent and to optimize reactor performance.

The phenomenon of biomass growth in fluid bed reactors and the problems associated therewith are well known, and a number of solutions have been proposed for removing excess biomass from the media bed to control bed expansion. For example, in the above-mentioned patents media bed expansion is directly measured as a function of bed height by a bed level sensor, such as an optical sensor for example. When bed height reaches a level indicative of excessive biomass growth the bioparticles are abraded with a mechanical agitator to strip excess biomass therefrom. The stripped biomass is then carried out with the reactor effluent. This is disadvantageous because additional equipment (i.e., sludge dewatering or separation equipment, etc.) may be required downstream of the reactor. Additionally, the sensors employed to directly monitor bed height are subject to fouling and lack the reliability desired for continuous, maintenance-free service.

In U.S. Pat. Nos. 4,177,144 and 4,250,033 carry-over of sheared biomass with the reactor effluent is avoided by confining the sheared biomass to a separator column above the media bed. When activated, an agitator (such as a stirrer or a pump) associated with the separator column generates sheared biomass which is withdrawn from the separator column and partially sheared bioparticles which fall back into the media bed. If the agitator is continuously operated the water content of sludge (i.e., sheared biomass and water) withdrawn from the separator column will likely be sufficient to require dewatering equipment (and its accompanying capital and operating costs). To minimize the water content of the sludge, the agitator is operated only when signaled by an optical sensor or tuning fork device used to measure the height of the media bed. However, as mentioned above, those direct measuring devices are subject to fouling when left in the reactor for extended periods of time, and therefore must be periodically cleaned or only intermittently used (i.e., lowered into the reactor to take a bed height reading and then immediately withdrawn). This requires manual labor and prevents continuous and automatic bed height readings.

SUMMARY OF THE INVENTION

The invention provides a reactor apparatus including an expandable media bed and an improved measuring apparatus for monitoring the size of the media bed. The improved measuring apparatus is inexpensively yet durably constructed and provides reliable, accurate and continuous measurements of media bed size while avoiding fouling problems associated with prior art bed level sensing devices. The improved measuring apparatus operates by isolating a parameter indicative of the size, and particularly the height, of the media bed and then measuring that parameter to indirectly determine the size of the media bed. That reading is used to automatically control operation of a biomass growth control apparatus without manual input or supervision. By reliably monitoring media bed expansion and contraction so that the biomass growth control device operates only when needed, the water content of the sludge withdrawn from the reactor is minimized to eliminate or at least reduce the size and operating frequency of sludge dewatering equipment.

In particular, the improved measuring apparatus includes an isolating member configured to isolate a parameter that serves as an indicator of media bed size. In preferred embodiments the isolating member is a vertical tubular member that is emersed in the freeboard or effluent head developed above the media bed. The lower end of the tubular member is preferably positioned at or below the desired operating height of the media bed, and the isolated parameter results, at least in part, from the difference between the density of the media bed (effective specific gravity>1) and the density of the liquid (i.e., water) treated by the reactor (specific gravity≠1).

More particularly, the pressure developed in the effluent head outside the tubular member is the sum of the pressure resulting from the depth of the liquid in the reactor ($P_1$), and the pressure generated by the upward velocity of the liquid in the reactor ($\Delta P_{vel}$). However, the pressure developed within the tubular member is believed to be a function of $P_1$, $\Delta P_{vel}$, and the pressure generated as a result of the increased specific gravity of the media bed ($\Delta P_{bed}$) that surrounds but does not extend into the bottom of the tubular member. Applicants have observed that when the media bed level rises above the bottom of the tubular member the liquid in the tubular member rises above the surrounding liquid in the effluent head. Applicants have determined, through testing, that there is an approximately linear relationship between the height of the liquid in the tubular member above the surrounding liquid in the effluent head and the height of the media bed above the bottom of the tubular member. Applicants have also determined that a similar linear relationship exists between the pressure in an air space at the top of the tubular member (when the top of the tubular member is closed) and the height of the media bed above the bottom of the tubular member. Thus, by measuring the level of the liquid or the pressure within the tubular member, the height of the media bed, and hence its size, can be accurately determined.

The measuring apparatus is also provided with a sensing device for measuring the isolated parameter. The sensing device communicates with the interior of the tubular member and is preferably positioned remotely with respect to the media bed in the top of the tubular member to avoid fouling.

Also, liquid flow through the tubular member is static to further reduce the possibility of fouling the sensing device. When the sensing device reads a liquid level or pressure indicative of excess biomass growth (i.e., bed expansion), the sensing device switches a biomass control device on. When the height of the media bed contracts to a desirable level the sensing device switches the biomass control device off.

In one embodiment, the invention provides a reactor apparatus including a reactor which contains an expandable media bed and which is used to process an influent that forms an effluent head extending above the media bed. The reactor apparatus also includes means for measuring expansion of the media bed, such measuring means including a tubular member supported vertically in the reactor so that its top extends above the effluent head surface and its bottom communicates with the media bed. The measuring means also includes a sensing device positioned in the upper part of the tubular member so as to avoid fouling during reactor operation. The sensing device is used to measure a change in condition (i.e., liquid level change or pressure change, for example) in the tubular member to indicate changes in the size of the media bed. The measuring means is also operable to activate an arrangement for reducing the size of the media bed when conditions within the tubular member indicate an undesirable accumulation of material in the media bed.

The invention also provides a fluid bed reactor apparatus including a reactor tank for processing a liquid influent. The reactor tank contains an expandable media bed that includes particulate solids and biomass adhered to those particulate solids, and the liquid influent is passed upwardly through the media bed to fluidize the media bed and thereafter forms a liquid effluent head above the media bed. The fluid bed reactor apparatus also includes an agitator assembly that is operable to shear excess amounts of biomass from the particulate solids, and means for activating the agitator assembly responsive to expansion of the media bed. The activating means includes a vertical tubular member that is emersed in the liquid effluent head and that extends downwardly into the media bed to isolate a parameter indicative of media bed size. The activating means also includes a device for measuring changes in that parameter and means for switching the agitator assembly on if the parameter readings are indicative of excessive biomass growth in the system.

Other features and advantages of the invention will become apparent to those skilled in the art upon review of the detailed description, claims and drawings.

BRIEF DESCRIPTION OF THE DRAWINGS

FIG. 4 is a view similar to FIG. 1 and illustrates a fluid bed reactor apparatus including a sensing or measuring device in accordance with a second embodiment of the invention.

Figure 1:
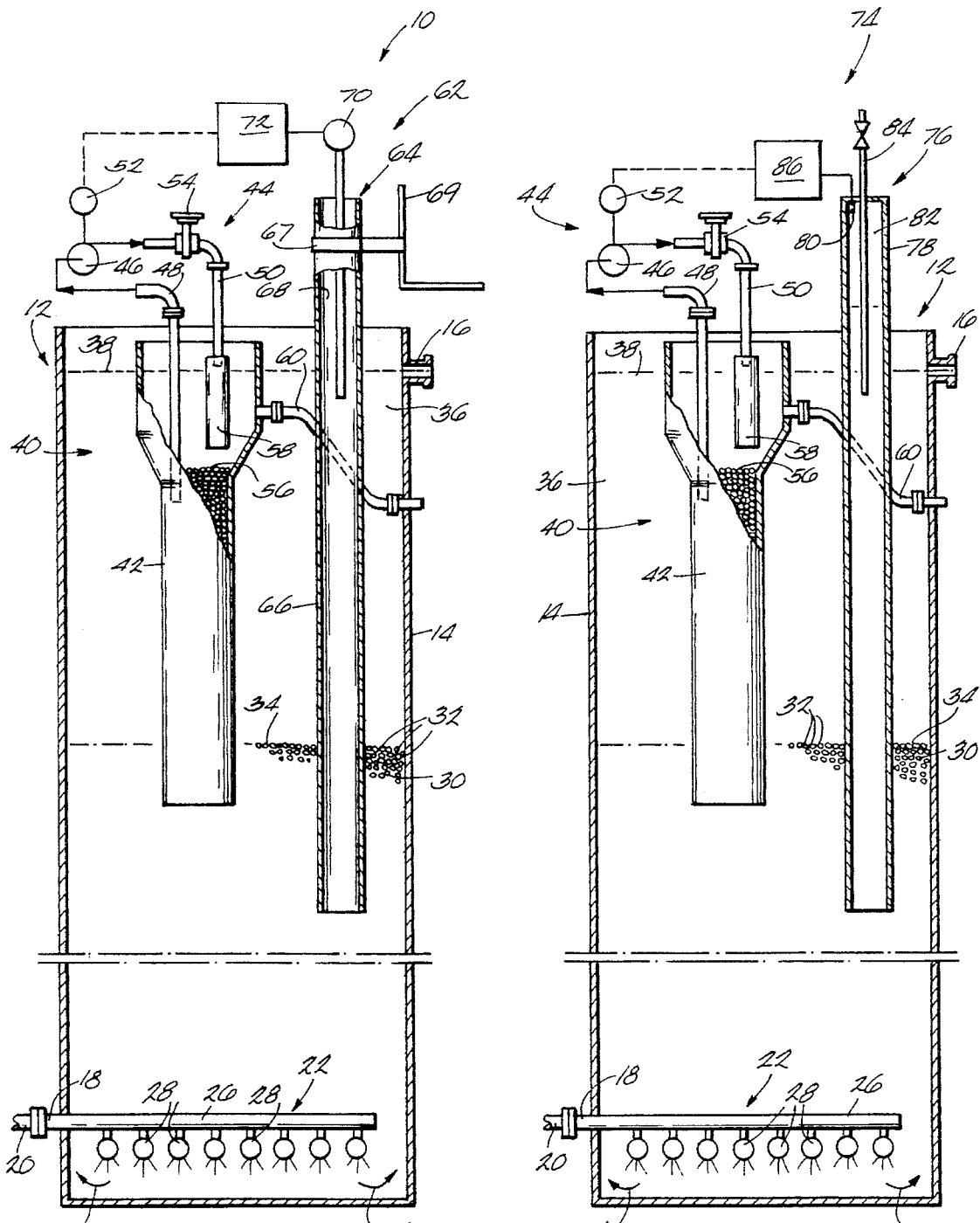
FIG. 1 is a partially schematic side elevational view, partially broken away and in section, of a fluid bed reactor apparatus including a sensing or measuring device that is operable to monitor the size of the media bed in the reactor apparatus and that embodies various features of the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a reactor apparatus 10 which embodies the invention and which is used to subject a liquid to a treatment process. While the reactor apparatus 10 can be used to treat various liquids (i.e., water, liquors, etc.) in the illustrated arrangement the reactor apparatus 10 operates to remove impurities from wastewater.

As shown in FIG. 1, the reactor apparatus 10 comprises a reactor 12. The reactor 12 includes an open-top reactor tank 14 having a discharge port 16 adjacent its upper end and an inlet port 18 adjacent its base. The inlet port 18 is connected to a line 20 for delivering wastewater (or other liquid) from a remote source (not shown) to the reactor 12 for treatment. The reactor 12 also includes a flow distributor 22 or other suitable means for introducing the wastewater into the reactor tank 14 as a liquid influent (indicated by arrows 24). The flow distributor 22 includes a header member 26 that is connected to the inlet port 18 and that is manifolded to a plurality of nozzle-studded lateral pipes 28 which evenly distribute the liquid influent 24 throughout the cross-section of the reactor tank 14.

To treat the liquid influent 24, the reactor 12 is provided with a media bed 30 that is contained in the reactor tank 14. While the media bed 30 may be non-biological in nature and may be capable of use under either anaerobic or aerobic conditions, in the illustrated arrangement the media bed 30 includes biological material or biomass selected to accomplish the processing objectives of the system under aerobic conditions. The media bed 30 also includes particulate solids, preferably granular activated carbon, that act as carriers to support the biomass which adheres thereto to form bioparticles 32.

The reactor 12 is operated by supplying a stream of wastewater through line 20 to the reactor tank 14. To insure sufficient oxygen levels to support the needed biological action in the media bed 30, the wastewater is preferably subjected to oxygenation prior to entering the reactor tank 14. The oxygenated wastewater is then introduced into the reactor tank 14 through the flow distributor 22 as the liquid influent 24. While in other embodiments the reactor 12 is capable of operating as a fixed bed reactor, in the illustrated arrangement the reactor 12 is an expanded or fluidized bed reactor. Thus, the wastewater is supplied to the reactor 12 at a rate sufficient to provide the liquid influent 24 with the upflow velocity needed to fluidize the media bed 30. The height or level of the fluidized media bed 30 is indicated by reference numeral 34 and under normal operating conditions is maintained at a preferred height or level. As shown in FIG. 1, media bed level 34 is maintained well below the level of the discharge outlet 16 so that bioparticles 32 are not washed out of the reactor 12.

As the liquid influent 24 passes upwardly through the media bed 30 the biomass, under aerobic conditions, interacts with the liquid influent 24 to consume or neutralize the targeted impurities therein. The treated liquid reactor effluent thus produced forms a liquid effluent head 36 above the media bed 30. In the illustrated arrangement, the effluent head 36 has an upper surface 38, the level of which is controlled by the discharge port 16 through which the liquid effluent is withdrawn for further downstream treatment or discharge into the environment. In addition to the removal of unwanted impurities from the liquid influent 24, the interaction between the biomass and the liquid influent 24 produces biological cellular growth that causes the media bed 30 to expand (i.e., causes the media bed upper level 34 to rise).

To control biomass growth and media bed expansion resulting therefrom, the reactor apparatus 10 is provided with means for removing excess amounts of biomass from the particulate solids and ultimately from the reactor 12. In the illustrated arrangement, the means for removing excess biological material includes a bed growth or biomass control apparatus 40 including a tubular separator column 42 emersed in the effluent head 36 and supported in the reactor tank 14 by suitable means such as brackets (not shown). The biomass control apparatus 40 also includes an agitator circuit 44 associated with the separator column 42. The agitator circuit 44 includes a suitable agitator or shearing device such as a pump 46, a suction line 48 extending into the separator column 42 from the pump 48, and a return line 50 also extending into the separator column 42 from the pump 46. The pump 46 is operated by suitable means such as a motor 52. To induce shear in excess of that produced directly by the pump 46, a flow constricting device such as an throttling valve 54 is provided in the return line 50. The throttling valve 54 is adjustable to impart a desired amount of additional shearing action. Examples of other suitable bed growth control apparatus are illustrated in aforementioned U.S. Patent Nos. 4,177,144 and 4,250,033, which are herein incorporated by reference.

When the pump 46 is activated, the media bed 30 is drawn upwardly into the separator column 42 to the level generally indicated by reference numeral 56, and bioparticles 32 are withdrawn through the suction line 48. The pump 46 (and flow constricting device 54) then hydraulically shear excess biomass from the bioparticles 32, and the excess biomass and partially sheared bioparticles 32 are reintroduced into the separator column 42 via return line 50. A downcomer tube 58 on the end of the return line 50 provides an expanded area to minimize turbulence when the bioparticles 32 and sheared biomass are returned to the separator column 42. The partially sheared bioparticles 32 then fall back into the media bed 30 and the sheared biomass is removed via waste line 60.

The reactor apparatus 10 also comprises means 62 for activating the agitator circuit 44 (i.e., the pump 46 and motor 52) in response to a condition of excess biomass within the media bed 30. In the illustrated arrangement the size of the media bed 30, and particularly its height, is indicative of the amount of biomass in the media bed 30, and the activating means 62 includes means for measuring or monitoring media bed expansion and contraction by measuring media bed level 34. In the embodiment illustrated in FIGS. 1 and 2, the means for measuring media bed expansion and contraction includes a bed height monitoring or sensing device 64 capable of detecting the interface between the media bed 30 and the effluent head 36 (i.e., the height of media bed level 34).

The bed height sensing device 64 includes means for isolating a condition or parameter indicative of the height of the media bed 30. In the illustrated arrangement the means for isolating the parameter includes a tubular member 66 supported vertically in the reactor tank 14. The tubular member 66 is supported by suitable means such as mounting brackets 67 (only one is shown) on a catwalk 69 that extends over the reactor tank 14. As shown in FIG. 1, the tubular member 66 is positioned such that it is emersed in the effluent head 36 with its upper end extending above the effluent head 36 and its lower end extending downwardly to at least the media bed level 34 and preferably below that level. The extent of the tubular member 66 below media bed level 34 is indicated by (FIG. 2) reference character Y.

Figure 2:
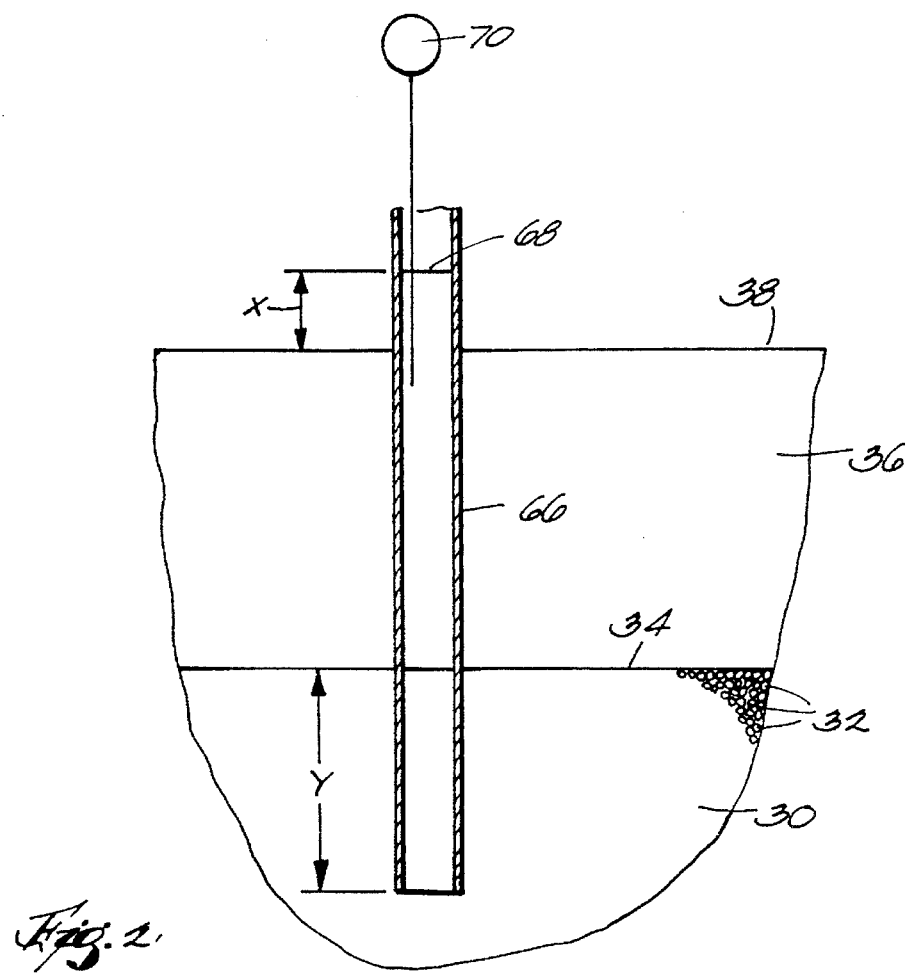
FIG. 2 is an enlarged view of a portion of the fluid bed reactor apparatus illustrated in FIG. 1.
Figure 3:
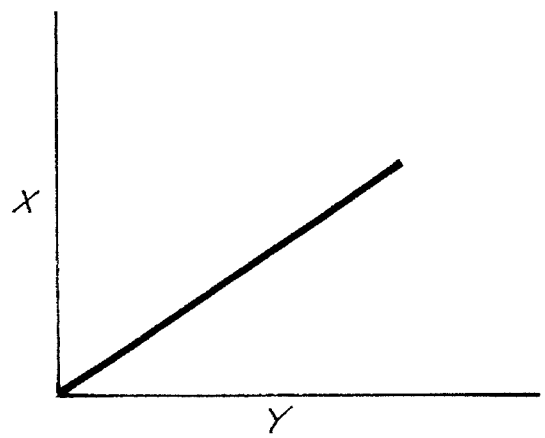
FIG. 3 is a graphic representation of the relationship between media bed height in the reactor apparatus illustrated in FIGS. 1 and 2 and a parameter indicative of that height.

As shown in FIGS. 1 and 2, a portion of the effluent head 36 extends into and is isolated within the tubular member 66. Applicants have observed that the level of the effluent head 36 isolated within the tubular member 66 (indicated with reference numeral 68) rises to a level above the upper surface 38 of the effluent head 36 when the reactor 12 is in operation. The difference between the effluent head levels 38 and 40 is indicated by reference character X. Applicants have determined that the relationship (see FIG. 3) between parameter X and parameter Y is linear when the bottom of the tubular member 66 is below media bed level 34 and the upward velocity or flux of liquid influent 24 is constant. Thus, since the level of the bottom of the tubular member 66 above the bottom of the tank 14 is known and is constant, parameter X can be used to indirectly determine parameter Y from which media bed height can be calculated.

The bed height sensing device 64 also includes means for measuring a change in the isolated condition or parameter (i.e., parameter X) to determine changes in the size of the media bed 30. In the arrangement illustrated in FIGS. 1 and 2 the means for measuring a change in the selected condition or parameter includes a liquid level measuring device or level sensor 70 to detect changes in liquid level 68. The level sensor 70 communicates with the interior of the tubular member 66 and is positioned remotely from the media bed 30 in the upper end of the tubular member 66. The level sensor 70 can be of any suitable design.

The activating means 62 also includes a control unit 72 or other suitable means for activating the agitator circuit 44 when signaled by the level sensor 70. The control unit 72 can be conventional and is operably connected between the level sensor 70 and the motor 52. When the level sensor 70 reads a value of parameter X indicating that media bed level 34 has risen above a preferred height, the control unit 72 switches the motor 52 on. When the media bed level 34 returns to a preferred level the control unit 72 switches the motor 52 off so that the pump 46 only operates when needed.

In the illustrated arrangement the bed growth control apparatus 40 is switched on and off by the activating means 62 and is capable of only one operating speed. It will be understood by one skilled in the art that the bed growth control apparatus could be modified to operate at varying speeds (i.e., replacing the motor 52 with a variable speed motor, for example). In that arrangement the activating means 62 could be used to control the speed of the bed growth control apparatus 40 to vary the rate at which biomass is removed from the system, and the operation of the bed growth control apparatus 40 could be continuous if warranted.

Illustrated in FIG. 4 is a reactor apparatus 74 including alternative means 76 for activating the agitator circuit 44. The remaining parts of the reactor apparatus 74 are as described with respect to reactor apparatus 10, and like reference numerals denote components common to both systems.

The activating means 76 includes a tubular member 78 having a closed top and a suitable pressure measuring or sensing device 80 for measuring pressure changes in an air space 82 occupying the upper end of the tubular member 78. The air space 82 is replenishable, when needed, via a bubble tube 84 connected to an air source (not shown). The relationship between the pressure in the top of the tubular member 78 and parameter Y is also proportional, and a control unit 86 is provided to switch the motor 52 on and off when pressure conditions sensed by the pressure measuring device 80 dictate.

Advantageously, by operating the pump 46 only when needed the water content of the sludge (i.e., water and sheared biomass) drawn through the waste line 60 is minimized. Thus, sludge processing equipment (i.e., dewatering and settling equipment) can be eliminated or downsized to reduce capital and operating costs associated with the reactor apparatus 10 and 74. Also, by positioning the level sensor 70 or pressure measuring device 80 away from contact with the media bed 30 and in respective tubular members 66 and 78 where flow is static, fouling is avoided so that those devices are automatically and continuously operable with little or no maintenance or supervision.

We claim:

1. A reactor apparatus comprising:
   a reactor for processing an influent, said reactor including a tank containing an expandable media bed, the influent forming an effluent head extending above said media bed, and
   means for measuring expansion of said media bed, said means for measuring expansion of said media bed including a tubular member supported vertically in said tank, said tubular member including an upper end portion extending above the effluent head, and a lower end portion communicating with said media bed.

2. A reactor apparatus as set forth in claim 1 wherein said means for measuring expansion of said media bed includes means communicating with the interior of said tubular member for measuring a change in condition within said tubular member.

3. A reactor apparatus as set forth in claim 2 wherein said means for measuring a change in condition within said tubular member communicates with the upper end portion of said tubular member and is positioned remotely with respect to said media bed.

4. A reactor apparatus as set forth in claim 2 wherein the effluent head extends into said tubular member, and wherein said means for measuring a change in condition within said tubular member includes a liquid level measuring device.

5. A reactor apparatus as set forth in claim 2 wherein said means for measuring a change in condition within said tubular member includes a pressure measuring device.

6. A reactor apparatus as set forth in claim 1 wherein said means for measuring expansion of said media bed includes a bed height sensing device for indirectly measuring the vertical height of said media bed, said bed height sensing device being positioned remotely from media bed so as to avoid contact with said media bed, and said bed height sensing device communicating with said tubular member.

7. A reactor apparatus as set forth in claim 6 wherein said media bed includes particulate solids and biomass adhered to said particulate solids, and said media bed has a predetermined operating height, wherein said reactor apparatus includes an agitator communicating with the media bed for removing excess amounts of said biomass from said particulate solids, and wherein said means for measuring expansion of said media bed is operable to activate said agitator when the height of said media bed rises above said predetermined operating height.

8. A reactor apparatus as set forth in claim 1 wherein said media bed has a height, wherein said tubular member isolates a parameter indicative of said height of said media bed, and wherein said means for measuring expansion of said media bed includes means for measuring said parameter to determine said height of said media bed.

9. A reactor apparatus comprising:
   a reactor for processing an influent, said reactor containing an expandable media bed having a height dimension;
   means for isolating a parameter indicative of said height dimension of said media bed, said means for isolating a parameter including an isolating member extending from said media bed and supported within said reactor; and
   a sensing device for measuring said parameter to detect changes in said height dimension of said media bed, said sensing device being positioned remotely from said media bed so that said sensing device avoids fouling by media bed constituents.

10. A reactor apparatus as set forth in claim 9 wherein the influent forms an effluent head extending above said media bed, wherein said isolating member is a vertically extending tubular member, said tubular member being emersed in the effluent head and extending downwardly into said media bed.

11. A reactor apparatus as set forth in claim 10 wherein said tubular member includes an upper end portion extending above the effluent head, and wherein said sensing device communicates with the interior of said tubular member and is positioned above the effluent head.

12. A reactor apparatus as set forth in claim 10 wherein a portion of the effluent head extends into said tubular member and is isolated therein, the portion of the liquid effluent head in said tubular member having an upper level, and wherein said sensing device senses the upper level of the portion of the effluent head in said tubular member.

13. A reactor apparatus as set forth in claim 10 wherein said tubular member includes a closed upper end portion, and wherein said sensing device is a pressure sensing device for sensing pressure within said closed upper end portion.

14. A reactor apparatus as set forth in claim 9 wherein said media bed includes particulate solids and biomass adhered to said particulate solids, wherein said reactor apparatus includes an agitator for removing excess amounts of said biomass from said particulate solids, and means connected between said agitator and said sensing device for activating said agitator responsive to changes in said height dimension of said media bed.

15. A reactor apparatus comprising:
   a fluid bed reactor for processing a liquid influent, said fluid bed reactor including a tank containing an expandable media bed, said media bed including particulate solids, and biomass adhered to said particulate solids, the liquid influent being passed upwardly through said media bed to fluidize said media bed, and the liquid influent passed through said media bed forming a liquid effluent head extending above said media bed, the liquid effluent head having an upper level; and
   a measuring apparatus for detecting the level of said media bed within said tank, said measuring apparatus including a vertical tubular member supported in said tank, said vertical tubular member being emersed in the liquid effluent head and extending downwardly into said media bed, said vertical tubular member including an upper end portion extending above the upper level of the liquid effluent head, and said measuring apparatus including a bed height sensing device communicating with said upper end portion of said vertical tubular member, said bed height sensing device being positioned remotely from said media bed so that said bed height sensing device avoids fouling.

16. A reactor apparatus as set forth in claim 15 wherein said tubular member isolates a parameter indicative of the level of said media bed in said tank, and wherein said bed height sensing device senses changes in said parameter to indirectly determine changes in the level of said media bed.

17. A reactor apparatus as set in claim 16 wherein said reactor apparatus includes an agitator, said agitator being operable to shear excess amounts of said biomass from said particulate solids, and means connected between said measuring apparatus and said agitator for activating said agitator responsive to a change in said parameter indicative of expansion of said media bed.

\* \* \* \* \*